(12) United States Patent
Halawani et al.

(10) Patent No.: US 12,407,549 B2
(45) Date of Patent: Sep. 2, 2025

(54) OUTPUT SIGNAL PROTOCOL

(71) Applicant: Allegro MicroSystems, LLC, Manchester, NH (US)

(72) Inventors: Ahmad Nour Halawani, Heidelberg (DE); Emil Pavlov, Heidelberg (DE)

(73) Assignee: Allegro MicroSystems, LLC, Manchester, NH (US)

( * ) Notice: Subject to any disclaimer, the term of this patent is extended or adjusted under 35 U.S.C. 154(b) by 2 days.

(21) Appl. No.: 18/502,259

(22) Filed: Nov. 6, 2023

(65) Prior Publication Data
US 2025/0150314 A1    May 8, 2025

(51) Int. Cl.
*H03K 9/08* (2006.01)
*H04L 25/49* (2006.01)

(52) U.S. Cl.
CPC ................. *H04L 25/4902* (2013.01)

(58) Field of Classification Search
CPC ....... G04F 10/005; G04F 1/08; H04L 1/0003; H04L 25/03006; H04R 29/00
USPC ............................................ 375/238; 330/10
See application file for complete search history.

(56) References Cited

U.S. PATENT DOCUMENTS

| | | | |
|---|---|---|---|
| 8,860,404 B2 | 10/2014 | Dwyer et al. | |
| 9,046,383 B2 | 6/2015 | Friedrich et al. | |
| 9,068,859 B2 | 6/2015 | Dwyer et al. | |
| 10,495,700 B2 | 12/2019 | Prentice et al. | |
| 2002/0080631 A1* | 6/2002 | Kanouda | H02M 3/158 363/62 |
| 2007/0109044 A1* | 5/2007 | Nielsen | H03F 3/217 330/10 |
| 2009/0273396 A1* | 11/2009 | Nam | H03F 3/217 330/10 |
| 2015/0023511 A1* | 1/2015 | Quan | H04R 29/004 381/58 |
| 2023/0206813 A1* | 6/2023 | Kang | G09G 3/2007 318/685 |
| 2023/0414106 A1* | 12/2023 | Segal | A61B 5/11 |
| 2024/0036525 A1* | 2/2024 | Al-Maharmeh | G06F 9/54 |

* cited by examiner

*Primary Examiner* — Khai Tran
(74) *Attorney, Agent, or Firm* — Daly, Crowley, Mofford & Durkee, LLP

(57) ABSTRACT

A signal encoding and decoding protocol to convey discrete sets of information combined in a single carrier signal is disclosed. The protocol uses modulation of both amplitude and pulse width to carry multiple sets of information. A first signal is pulse width modulated to encode a first data and a second signal is pulse amplitude modulated to encode a second data. The two modulated signals are combined to generate a carrier signal encoded with both the first and second data.

20 Claims, 9 Drawing Sheets

OUTPUT SIGNAL PROTOCOL

FIELD OF TECHNOLOGY

The present disclosure relates to signal processing and, more particularly, to an output signal protocol using both pulse width and amplitude modulation to transmit information.

BACKGROUND

As is known, sensors are used in various types of devices to measure and monitor properties of systems in a wide variety of applications. For example, sensors have become common in products that rely on electronics in their operation, such as automotive control systems. Examples of automotive applications are detection of wheel speed for antilock braking systems and four-wheel steering systems, and the speed and direction of transmission gears.

Some sensors monitor properties by detecting a magnetic field associated with proximity or movement of a target object with respect to one or more magnetic field sensing elements. In an automotive application, the sensor output signals can be coupled to an engine control unit (ECU) for further processing, such as detection of gear or wheel speed, direction and/or vibration.

Sensor output signals are encoded into signals that can be conveyed across systems where they are then decoded and processed accordingly. Encoding analog and digital signals relies on modulation techniques to alter the properties of waveforms thereby encoding information onto a single output, or carrier signal. Characteristics of a signal, including amplitude, frequency and phase, can be varied to convey information on a carrier signal.

As one example, pulse amplitude modulation (PAM) is a modulation protocol that may represent signals and convey information in the digital domain. As shown in FIG. 1A, a pulse amplitude modulated signal 100 may have a varying amplitude in which each amplitude level over a period, T, may convey a different binary word 102a-102d. For example, FIG. 1A depicts a PAM4 protocol in which four, 2-bit binary words may be encoded to convey a dataset 104. According to the exemplary signal modulation protocol, the signal 100 may be encoded such that the amplitude level 102a from 0 to T may indicate a word '11', while the amplitude level 102b from T to 2T indicates a word '10', the amplitude level 102c from 2T to 3T indicates '00' and the amplitude level 102d from 3T to 4T indicates '01'. Over the illustrated six periods from 0 to 6T, the varying amplitude levels may carry the data sequence '11,' '10,' '00,' '01,' '11,' '00,' where amplitudes of the same level indicate the same word.

Another signal modulation protocol involves varying the pulse width of a signal in order to thereby vary the ratio between the active pulse duration and the pause duration in a given period (i.e., the duty cycle) in order to convey certain information. FIG. 1B depicts an exemplary signal chart 150 of a pulse width modulation (PWM) protocol, in which the active pulse widths over the period T are varied to convey 2-bit binary words. For example, the carrier signal 110 may have an active pulse width 110a for about 25% of the period T. The signal 110 having a 25% duty cycle may indicate the binary word '00'. Similarly, a carrier signal 112 with a 50% duty cycle 112a indicates the word '01'; a carrier signal 114 with a 75% duty cycle 114a indicates the word '10'; and a carrier signal 116 with a 100% duty cycle 116a indicates the word '11'.

SUMMARY

Aspects of the present disclosure relate generally to a signal encoding and decoding protocol to convey discrete sets of information combined in a single carrier signal. Aspects of the protocol include using modulation of both amplitude and pulse width to carry multiple sets of information. Rather than rely on multiple signals and the hardware, software and signal processing required to encode, transmit, and decode them, aspects of the present disclosure provide for increased spectral efficiency by using multiple modulation techniques to convey multiple datasets in one signal.

According to one aspect of the disclosure, an apparatus includes a first processor configured to generate a first signal including a modulated pulse width and a second processor configured to generate a second signal including a modulated amplitude. An output controller may be configured to combine the first signal and the second signal to generate an output signal.

The apparatus can include one or more of the following features alone or in combination. The output controller may include a multiplier configured to multiply the first signal and the second signal to generate the output signal. The first signal may be representative of first data and wherein the second signal is representative of second data. A decoder may be operable to decode the output signal to determine the first data and the second data. The decoder may include an analog-to-digital converter adapted to measure the amplitude level of the output signal after a rising edge. The decoder may further include a capacitor charged over a time, T. The amplitude may be determined by dividing the charge of the capacitor, Q, by a duty cycle of the output signal. An analog-to-digital converter may be adapted to decode the amplitude to determine the first data. At least one sensing element may be operable to generate at least one of the first signal and the second signal. The at least one sensing element may include one or more of a magnetic field sensing element, an inductive sensing element, a resistive sensing element, an optical sensing element, a pressure sensing element, a motor control element, or a temperature sensing element. The at least one sensing element may further include a magnetic field sensing element operable to generate the first signal, wherein the first signal is indicative of a magnetic field associated with an object. The first data may be one or more of flux density, angle, position, speed, or current. The second data may include a direction of rotation of the object. The second signal may include a diagnostic signal. A diagnostic circuit may be configured to generate the diagnostic signal.

According to another aspect of the disclosure, a method of communicating an output signal may include generating one or more signals, processing the one or more signals to generate a pulse width modulated (PWM) signal having a pulse width indicative of first data, processing the one or more signals to generate a pulse amplitude modulated (PAM) signal having an amplitude indicative of second data; and generating an output signal by combining the pulse width modulated signal and the pulse amplitude modulated signal.

The method of communicating an output signal may include one or more of the following features alone or in combination. The method may include multiplying the first signal and the second signal to generate the output signal. The one or more signals may be generated by at least one sensing element. The at least one sensing element may include one or more of a magnetic field sensing element, an inductive sensing element, a resistive sensing element, an optical sensing element, a pressure sensing element, a motor control element, or a temperature sensing element. The at least one sensing element may include a magnetic field sensing element operable to generate the first signal that is indicative of a magnetic field associated with an object. The method may further include decoding by a microcontroller the pulse width of the output signal to determine the first data and decoding by the microcontroller the amplitude of the output signal to determine the second data. The decoding of the amplitude may include measuring the amplitude level of the output signal after a rising edge.

It is appreciated that the concepts, techniques, and structures disclosed herein may be embodied in other ways, and that the above summary of disclosed embodiments is thus meant to be illustrative rather than comprehensive or limiting. In particular, individual elements of different embodiments described herein may be combined to form other embodiments not specifically set forth above. Various elements, which are described in the context of a single embodiment, also may be provided in other embodiments separately, or in any suitable sub-combination. Moreover, other embodiments not specifically described herein also may be within the scope of the claims set forth below.

BRIEF DESCRIPTION OF THE DRAWINGS

The foregoing features of the disclosure, as well as the disclosure itself may be more fully understood from the following detailed description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

Aspects of the present disclosure relate generally to a signal encoding protocol to modulate both amplitude and pulse width to carry multiple sets of information. Aspects of the disclosure provide for increasing spectral efficiency in signal processing and transmission by using multiple modulation techniques to convey multiple datasets in one signal.

Aspects of the present disclosure provide an output protocol in which the ability to modulate or encode data in both the pulse amplitude and pulse width of a carrier signal facilitates the transmission of information through a system, such as a sensor monitoring a target.

Figure 1A:
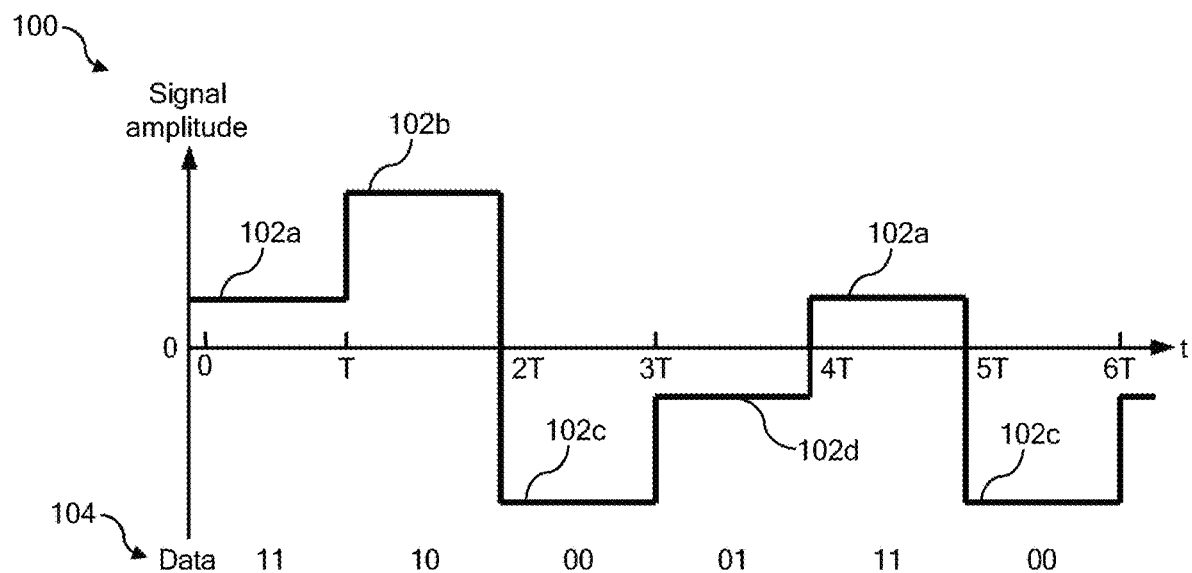
FIG. 1A shows an example of pulse amplitude modulation.
Figure 1B:
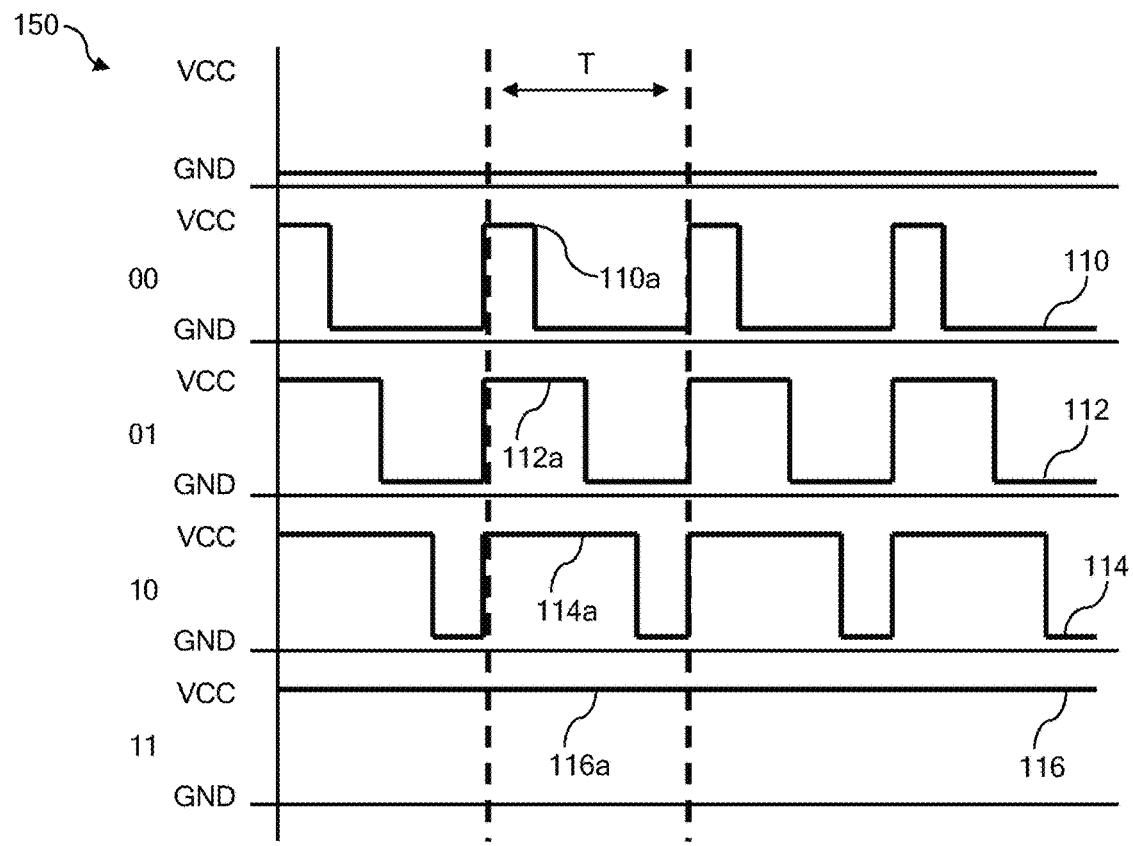
FIG. 1B shows an example of pulse width modulation.
Figure 2A:
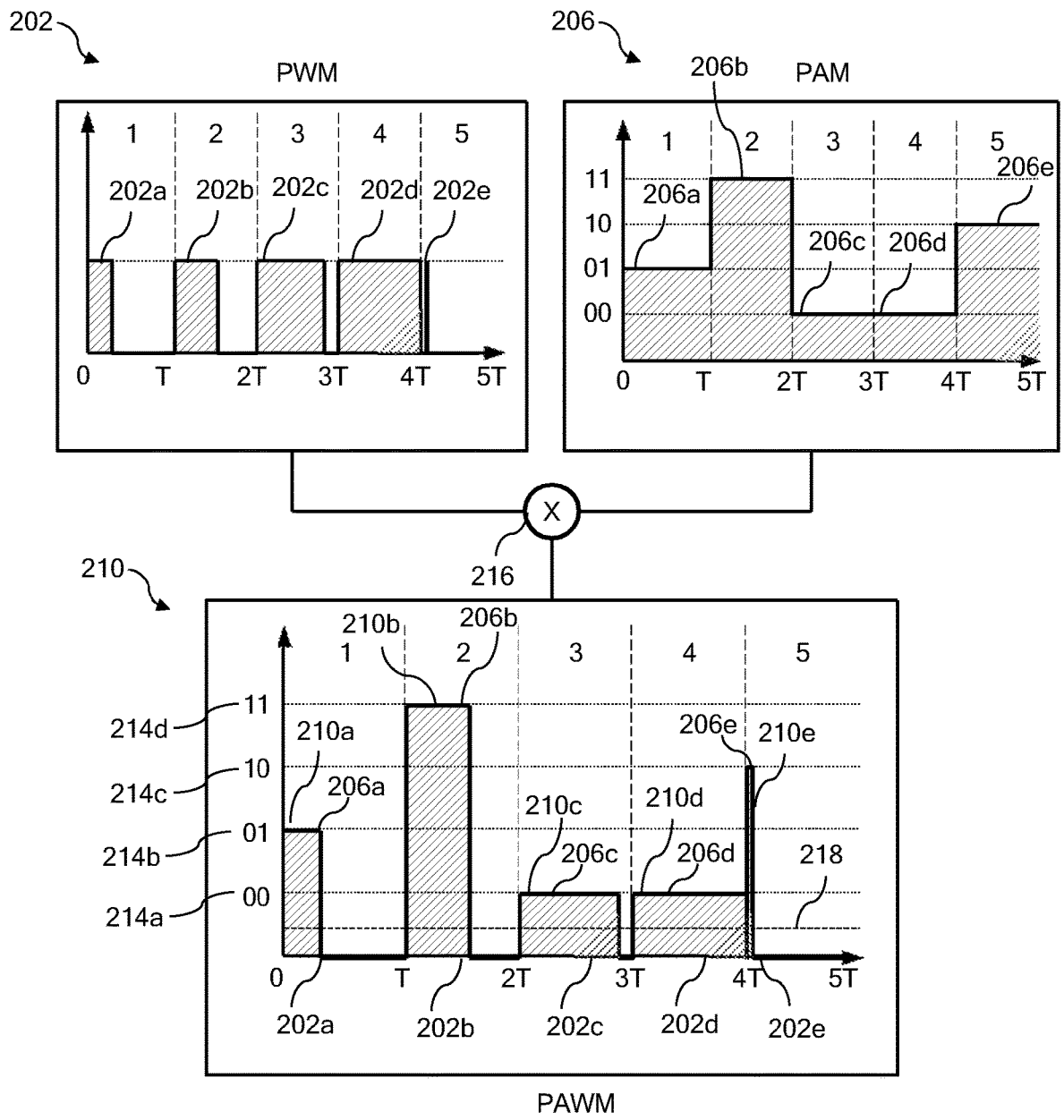
FIG. 2A shows a flow diagram of a pulse amplitude width protocol, according to aspects of the disclosure.

FIG. 2A depicts a flow diagram for generating a pulse amplitude width modulated signal referred to herein as a "PAWM" signal. A PAWM signal 210 results from combining a pulse width modulated signal 202 and an amplitude modulated signal 206.

A PWM signal 202 may be used to encode data according to the varying duty cycles 202a-e across multiple periods (0-5T). For example, as shown in FIG. 2A, the PWM signal 202 may be characterized by up to five duty-cycles, each duty cycle representative of an encoded value. Accordingly, the PWM signal 202 may have a 25% duty cycle 202a over a first period (0-T). Over the second period (T-2T), the PWM signal 202 may have a 50% duty cycle 202b; Over the third period (2T-3T) the PWM signal 202 may have a 75% duty cycle 202c and a 100% duty cycle 202d over the fourth period (3T-4T). Over a fifth period (4T-5T), the PWM signal 202 may have a pulse 202e indicative of a 2% or less duty cycle. Therefore, the PWM signal 202 may convey, in the given example, up to five encoded values, each value associated with a different duty cycle 202a-e.

Similarly, the modulation of a carrier signal's amplitude can also convey information, albeit information independent from the PWM encoded data. For example, a PAM signal 206 may include varied amplitude levels 206a-e over a number of periods 0-5T. In contrast to the PWM signal 202, the duty cycle of the PAM signal 206 over each period is at or near 100%, however the amplitude levels 206a-e of the signal 206 vary over time. The PAM signal 206 may be characterized by up to four amplitude levels, each amplitude level corresponding to a 2-bit binary word (e.g., a PAM4 protocol). Accordingly, in one aspect, a first amplitude level 206a, shown in a first period (0-T) may represent the word '01.' A second amplitude level 206b, shown in a second period (T-2T) may represent '11'; a third amplitude level 206c, 206d in the third period (2T-3T) and fourth period (3T-4T) represents '00'; and a fourth amplitude level 206e represents '10' in the fifth period (4T-5T). Accordingly, the PAM signal 206 may convey the data values '01' '11' '00' '00' '10' over the five illustrated periods.

According to one aspect, the PAWM signal 210 may be generated by a multiplier 216 receiving the PWM signal 202 and PAM signal 206 as inputs. The output of the multiplier 216 may include two discrete datasets, the duty cycles corresponding to a first encoded value (202a-e) and amplitude levels corresponding to a second encoded value (214a-d), transmitted in a single, pulse amplitude and pulse width modulated signal 210. As shown in FIG. 2, the resulting PAWM signal 210 may include pulses having duty cycles 202a-e over each period (x-axis) corresponding to the PWM signal 202, while simultaneously having modulated amplitude levels 206a-e of the PAM signal 206 (y-axis). In the PAWM signal 210, a first pulse 210a may have a 25% duty cycle 202a at a first amplitude level 206a for the first period (0-T). The PAWM signal 210 over the second period (T-2T) may include a pulse 210b at a 50% duty cycle 202b at a second amplitude level 206b and a pulse 210c with a 75% duty cycle 202c in the third period (2T-3T) at a third amplitude level 206c and a pulse 210d with a 100% duty cycle 202d in the fourth period (3T-4T) with the same amplitude level 206d. A fifth pulse 210e may have a 2% duty cycle 202e in the fifth period (4T-5T) at a fourth amplitude level 206e.

According to one aspect, the PAWM signal 210 may convey two independent datasets. The first set, attributed to the PWM signal 202, over time 0-5T may include a first set of values corresponding to the varying duty cycles 202a-e, while the second set 214a-d, attributed to the varying amplitude levels 206a-e of the PAM signal 206, over time 0-5T may include a second set of values, such as '01' '11' '00' '00' '10'.

According to one aspect, for example, the PWM signal 202 may be generated from input signals received from a position, or angle sensor, while the PAM 206 signal may be received from a related or unrelated source, such as a diagnostic circuit, a counter, or the like. The angle sensor may output information relating to rotation of a target from 0-360°. In the first period the 25% duty cycle may represent an angle of 360*25%=90°. Also, in the first period the amplitude reaches a level associated with the binary value '01' which could indicate a shared information point, such as an error value, counter value, status or the like. Similarly, the duty cycle of 50% in the second period may indicate an angle of 180° (360*50%), while the amplitude indicates a value of '11.' In the third period, the 75% duty cycle may indicate a rotational position of 270° (360*75%) and a '00' data point from the amplitude component. The 100% duty cycle in the fourth period may indicate a position of 360° at the same '00' data point from the third period. The fifth period indicates a position of 0°, but also indicates an amplitude level corresponding to a value of '10', indicated by the pulse 210e. Accordingly, the independent datasets may be encoded into a single PAWM carrier signal 210, thereby increasing spectral efficiency and processing capabilities.

A threshold level 218 may be defined to assist in detecting the rising and falling edges of the PWM characteristics of the PWM signal 202 and PAWM signal 210. If a signal crosses the threshold level 218, a decoder may determine whether it is a rising or falling edge of the PWM signal and determine the duty cycle of the pulse. The defining of a threshold level 218 at a level lower than the lowest amplitude ensures that the amplitude modulated pulses are always transmitted while the pulse widths are detected. That is, according to one aspect, such a feature avoids a situation in which a PAM signal is present and in need of transmission when the pulse width needs to be 0%.

While the examples described above in connection with FIG. 2A depict a PAWM protocol encoding five PWM or four PAM values, one skilled in the art will appreciate that more or less data content may be encoded without deviating from the scope of the present disclosure. In other words, the PAWM signal may encode more or less than the example four amplitudes and may include more or less than the example five duty cycles. Further, while the examples described above include PAM and PWM signals having positive polarities, systems and methods described herein may also modulate signals having positive or negative amplitudes.

Figure 2B:
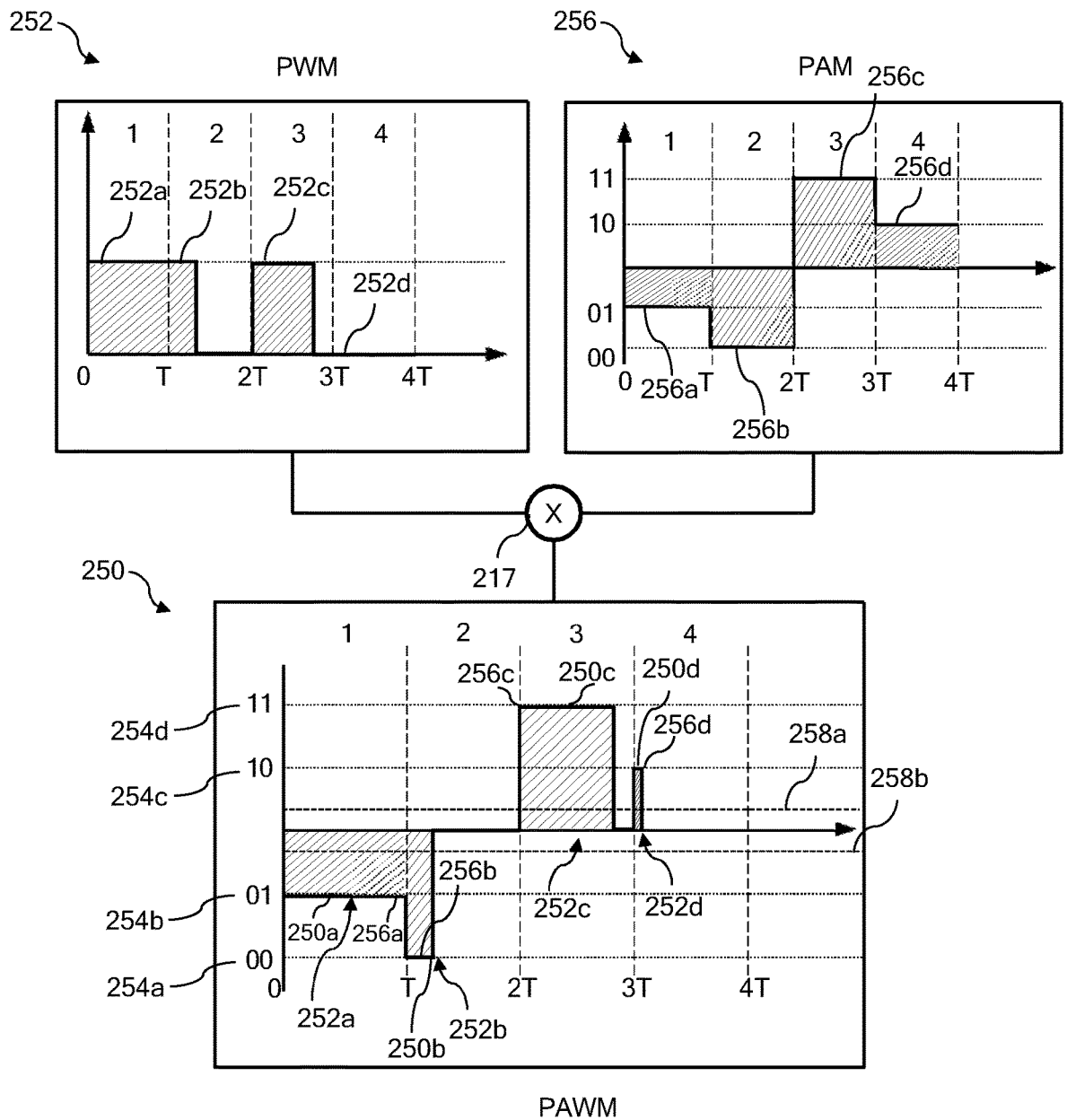
FIG. 2B shows a flow diagram of a pulse amplitude width protocol with positive and negative polarities, according to aspects of the disclosure.

FIG. 2B depicts a flow diagram for generating a PAWM signal 250 from signals having both negative and positive polarities. The PAWM signal 250 results from combining a pulse width modulated signal 252 and an amplitude modulated signal 256.

The PWM signal 252 may be used to encode data according to the varying duty cycles 252a-d across multiple periods (0-4T). For example, as shown in FIG. 2B, the PWM signal 252 may be characterized by up to four duty-cycles, each duty cycle representative of an encoded value. Accordingly, the PWM signal 252 may have a 100% duty cycle 252a over a first period (0-T). Over the second period (T-2T), the PWM signal 252 may have a 25% duty cycle 252b; over the third period (2T-3T) the PWM signal 252 may have a 75% duty cycle 252c and a 0% duty cycle 252d over the fourth period (3T-4T). Therefore, the PWM signal 252 may convey, in the given example, up to four encoded values, each value associated with a different duty cycle 252a-d.

Similarly, the modulation of a carrier signal's amplitude, including when negative, can also convey information, albeit information independent from the PWM encoded data. For example, the PAM signal 256 may include varied amplitude levels 256a-d over a number of periods 0-4T. In contrast to the PWM signal 252, the duty cycle of the PAM signal 256 over each period is at or near 100%, however the amplitude levels 256a-d of the signal 206 vary over time. The PAM signal 256 may be characterized by up to four amplitude levels, each amplitude level corresponding to a 2-bit binary word (e.g., a PAM4 protocol). As shown in FIG. 2B, the PAM signal may have positive or negative amplitude levels that, as explained below, may convey encoded values. Accordingly, in one aspect, a first amplitude level 256a having a negative polarity, in a first period (0-T) may represent the word '01.' A second amplitude level 256b, also with a negative polarity, in a second period (T-2T) may represent '00'; a third amplitude level 256c, having a positive polarity, in the third period (2T-3T) represents '11'; and a fourth amplitude level 256d represents '10' in the fourth period (3T-4T). Accordingly, the PAM signal 256 may convey the data values '01' '00' '11' '10' over the four illustrated periods.

According to one aspect, the PAWM signal 250 may be generated by a multiplier 217 receiving the PWM signal 252 and PAM signal 256 as inputs. The output of the multiplier 217 may include two discrete datasets, the duty cycles corresponding to a first encoded value (252a-d) and amplitude levels corresponding to a second encoded value (254a-d), transmitted in a single, pulse amplitude and pulse width modulated signal 250. As shown in FIG. 2B, the resulting PAWM signal 250 may include pulses having duty cycles 252a-d over each period (x-axis) corresponding to the PWM signal 252, while simultaneously having modulated amplitude levels 256a-d of the PAM signal 256 (positive and negative y-axis). In the PAWM signal 250, a first pulse 250a may have a 100% duty cycle 252a at a first (negative) amplitude level 256a for the first period (0-T). The PAWM signal 250 over the second period (T-2T) may include a pulse 250b at a 25% duty cycle 252b at a second (negative) amplitude level 256b, a pulse 250c with a 75% duty cycle 252c in the third period (2T-3T) at a third (positive) amplitude level 256c, and a pulse 250d with a 0% duty cycle 252d (or practically 2%) in the fourth period (3T-4T) at a fourth (positive) amplitude level 256d.

According to one aspect, the PAWM signal 250 may convey two independent datasets. The first set, attributed to the PWM signal 252, over time 0-4T may include a first set of values corresponding to the varying duty cycles 252a-d, while the second set 254a-d, attributed to the varying amplitude levels 256a-d of the PAM signal 256, over time 0-4T may include a second set of values, such as '01' '00' '11' '10'.

According to one aspect, for example, the PWM signal 252 may be generated from input signals received from a position, or angle sensor, while the PAM 256 signal may be received from a related or unrelated source, such as a diagnostic circuit, a counter, or the like. The angle sensor may output information relating to rotation of a target from 0-360°. In the first period the 100% duty cycle may represent an angle of 360°. Also, in the first period the amplitude level measures at a level, as a negative level, associated with the binary value '01' which could indicate a shared information point, such as an error value, counter value, status or the like. Similarly, the duty cycle of 25% in the second period may indicate an angle of 90° (360*25%), while the negative amplitude level indicates a value of '00.' In the third period, the 75% duty cycle may indicate a rotational position of 270° (360*75%) and a '11' data point from the amplitude component. The fourth period indicates a position of 0°, but also indicates an amplitude level corresponding to a value of '10', indicated by the pulse 250d. Accordingly, the independent datasets may be encoded into a single PAWM carrier signal 250, thereby increasing spectral efficiency and processing capabilities.

Threshold levels 258a, 258b may be defined (for positive and negative polarities, respectively) to assist in detecting the rising and falling edges of the PWM characteristics of the PWM signal 252 and PAWM signal 250. If a positive signal crosses the positive threshold level 258a, a decoder may determine whether it is a rising or falling edge of the PWM signal and determine the duty cycle of the pulse. Similarly, if a negative signal crosses the positive threshold level 258b, the decoder may determine whether it is a rising or falling edge of the PWM signal. The defining of threshold levels 258a, 258b at levels lower than the lowest respective positive or negative amplitude ensures that the amplitude modulated pulses are always transmitted while the pulse widths are detected.

Figure 3:
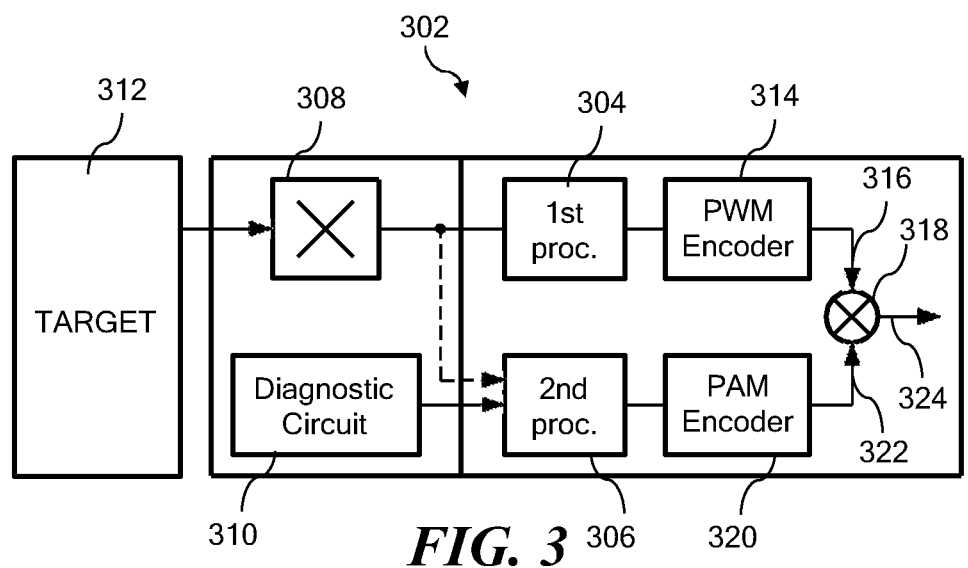
FIG. 3 shows a block diagram of a pulse amplitude width modulation system, according to aspects of the disclosure.

Turning now to FIG. 3, an exemplary implementation of a sensor 302 configured to encode and transmit information about a target 312 or other data source is shown. The information to be transmitted may come from a sensing element 308, a diagnostic circuit 310 or the like. According to one aspect, the sensing element 308 may be configured to detect a magnetic field associated with proximity or movement of the target 312 object, such as a gear, wheel. The sensing element 308 may be a source of a first dataset to be encoded and transmitted, while a diagnostic circuit 310 may be a source of a second dataset. According to one aspect, the sensing element 308 may also be the source for the second dataset. The diagnostic circuit 310 may be a circuit adapted to monitor and/or alert the system to a detected change in condition of one or more components of the system or a fault, failure, or error. The diagnostic circuit 310 may report conditions associated with the target 312, and/or the sensor 302, however, it need not be. The diagnostic circuit 310 may monitor an independent system component or element from which data is suitable for encoding and transmitting across the system.

The sensor 302 may include a first processor 304 and a second processor 306, each processor adapted to receive a dataset from one or more sources, such as the sensing element 308 or diagnostic circuit 310. According to one aspect, a single source may supply multiple, independent datasets. According to one aspect, the first processor 304 may receive data from the sensing element 308 relating to a detected condition of the target 312 such as angular position. The first processor 304 may calculate the angle from the sensing element 308 data and pass that data to a PWM encoder 314. The PWM encoder 314 may generate a PWM signal 316, as described herein, encoded with the angle data provided by the first processor 304. The PWM signal 316 may be coupled to a multiplier 318 for further processing.

The second processor 306 may receive a second dataset from a second source, such as the diagnostic circuit 310, or if from a single source, from the sensing element 308. According to one aspect, the second dataset may include other observed or detected characteristics from the target 312, including speed, position, direction of rotation, sensor diagnostics, magnetic flux density, current, or the like. As stated above, a second dataset from the diagnostic circuit 310 may include data denoting a status or detected change in condition of one or more components of the system. The second processor 306 may generate and pass a signal to a PAM encoder 320 where the signal amplitude may be modulated into a PAM signal 322, as described herein, to convey the observed data from the diagnostic circuit 310, or the sensing element 308. The PAM signal 322 may be coupled to the multiplier 318 in combination with the PWM signal 316.

According to one aspect, the multiplier 318 may combine the PWM signal 316 and the PAM signal 322 to generate the PAWM signal 324 as described herein. The PAWM signal 324 may include encoded data from both the first and second datasets. Data from the first dataset, in this example the angle of the target 312 detected by the sensing element 308, may be encoded into the pulse widths (i.e., duty cycles) of the PAWM signal 324. Data from the second dataset, received from the diagnostic circuit 310 or the sensing element 308, may be encoded into the amplitude of the signal pulses of the PAWM signal 324. The PAWM signal 324 thusly includes independent data from one or more sources encoded into a single carrier signal.

Figure 4A:
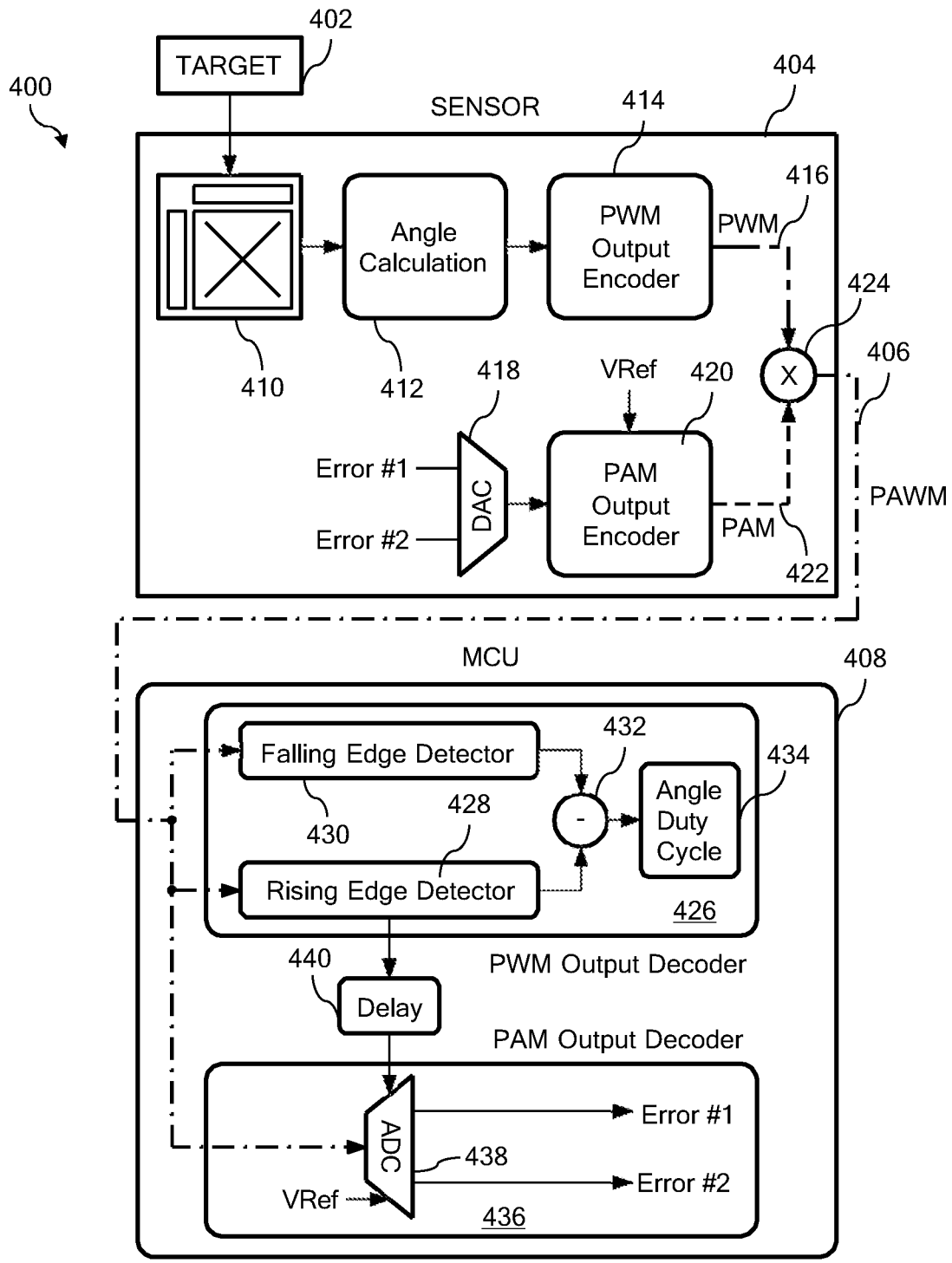
FIG. 4A shows a block diagram of a system for encoding and decoding a pulse amplitude width modulation signal, according to aspects of the disclosure.

FIG. 4A depicts a system 400 in which a target 402, such as a wheel or a gear, is monitored by a sensor 404 and a PAWM signal 406 is generated carrying two independent datasets to a microcontroller unit (MCU) 408, where the MCU 408 may decode the two datasets and process the data according to the system requirements. According to one aspect, the system 400 may be configured to sense and transmit the rotational angle of the target 402 as well as determine and transmit error diagnostics associated with the sensor 404.

According to one aspect, a magnetic field sensing element 410, such as a three-dimensional element, may detect a magnetic field associated with the rotation of the target 402. As the target rotates, magnetic field signals may be generated by the magnetic field sensing element 410 and an angle calculation processor 412 may use signals from the magnetic field sensing element 410 to determine the angular position of the target 402 at a given time. The determined angular position of the target 402 may be transmitted to a PWM output encoder 414 where the angular position data may be encoded into a PWM signal 416 as described herein.

According to one aspect, the sensor 404 may include an error diagnostic circuit in which one or more errors may be detected. Exemplary errors may include power loss, excess temperature, loss of target signal or the like. The error data may be generated as one or more error codes, shown in FIG. 4A as "Error #1" and "Error #2". The error data associated with the particular detected error may be passed through a digital-to-analog converter (DAC) 418 for coupling to a PAM output encoder 420 where the analog output signal may be encoded according to a PAM protocol, such as the PAM4 protocol detailed above, to generate a PAM signal 422 as described herein.

The PWM signal 416 and the PAM signal 422 may be passed to a multiplier 424 where the signals are multiplied to generate a single PAWM signal 406. The PAWM signal 406 may then be transmitted to the MCU 408 where the PAWM signal 406 may be decoded and the conveyed data may be further processed according to system design. According to one aspect, the PAWM signal 406 may be transmitted to a PWM output decoder 426 where a rising edge detector 428 detects the rising edge of a pulse and a falling edge detector 430 detects the falling edge. A time duration between rising and falling edges can be determined by a subtraction element 432 and the determined duration can be converted to the angular position of the target 402 by an angle duty cycle processor 434, such as may include a lookup table stored in memory for example. As such, and as described above, a 25% duty cycle may indicate a position of 90°, a 50% duty cycle indicates a 180° position, a 75% duty cycle indicates a 270° position, and a 100% duty cycle (or slightly less) indicates a 360° position.

While aspects of the present disclosure detail the use of a magnetic sensing element to detect a magnetic field associated with the rotation of a target, one skilled in the art will appreciate that other sensing elements may be used without deviating from the scope of the disclosure. For example, the sensing element may also or instead be, without limitation, an inductive sensing element, a resistive sensing element, an optical sensing element, a pressure sensing element, a motor control element, a temperature sensing element or the like.

The data encoded in the amplitude of the PAWM signal 406 may be decoded using the identification of the rising edge of the signal from the PWM output decoder 426. The PAWM signal 406 may be passed to a PAM output decoder 436 through an analog-to-digital (ADC) converter 438. The rising edge information from the rising edge detector 428 is transmitted to the ADC through a delay element 440 to account for the rise time, allowing the signal to reach the intended level and settle. A comparator (not shown) in the ADC 438 may measure the amplitude of the PAWM signal 406 at a time after the rising edge of the pulse. The determined amplitude level may then be assigned to the digital code describing the particular error code (Error #1 or Error #2). According to one aspect, because the PWM output decoder 426 may be present in an existing MCU, using the rising edge information to additionally decode the amplitude level is advantageous as it would not require new circuitry.

Figure 4B:
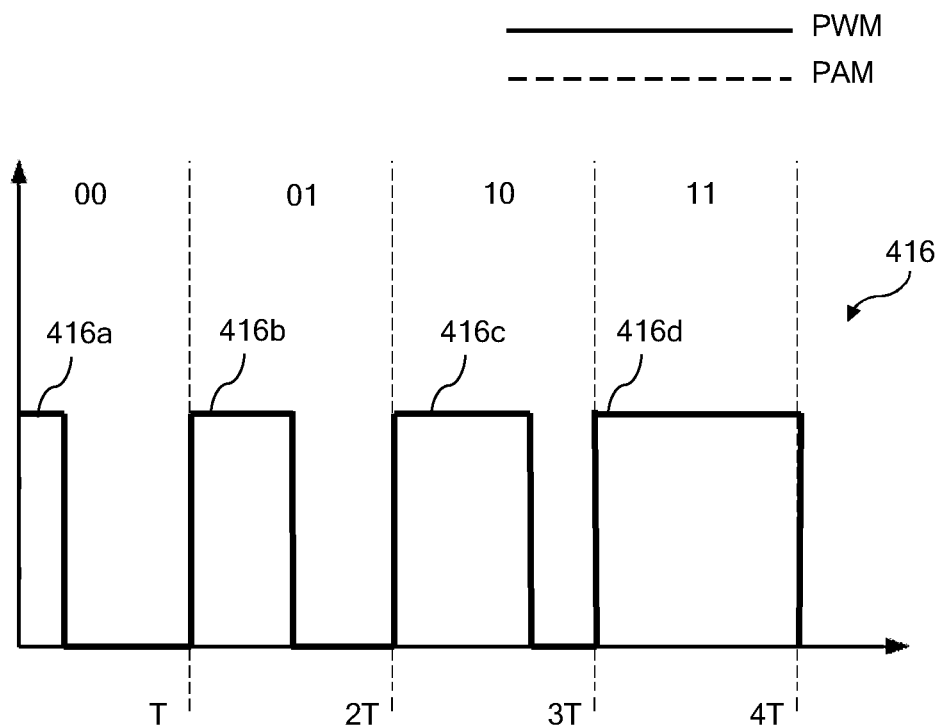
FIG. 4B shows the output signal from the pulse width modulation encoder of FIG. 4A, according to aspects of the disclosure.
Figure 4C:
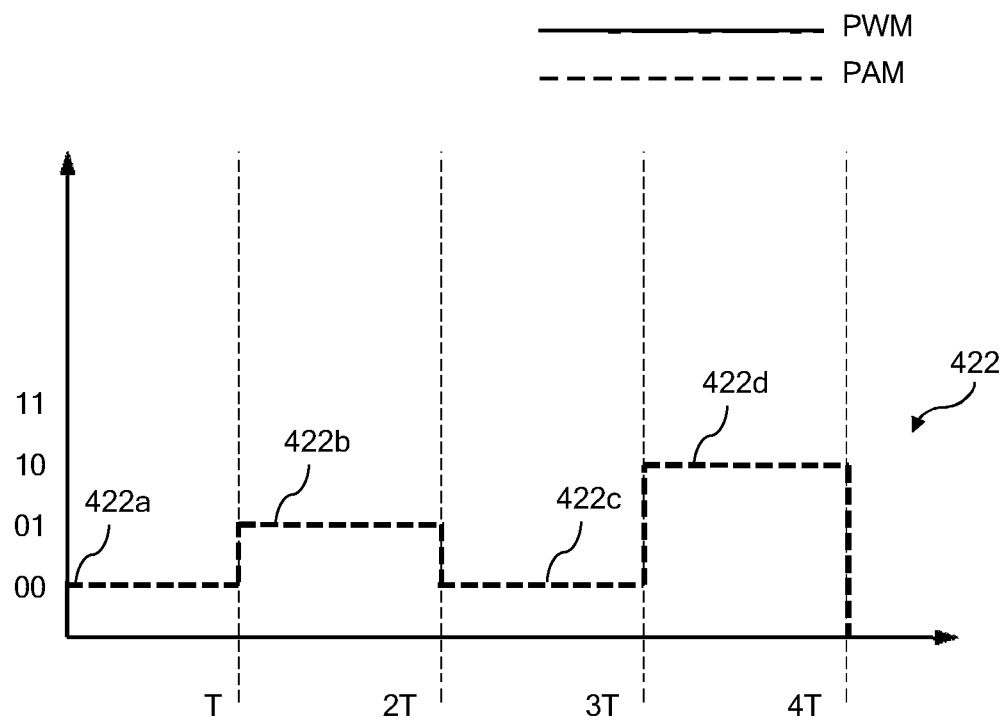
FIG. 4C shows the output signal from the pulse amplitude modulation encoder of FIG. 4A according to aspects of the disclosure.
Figure 4D:
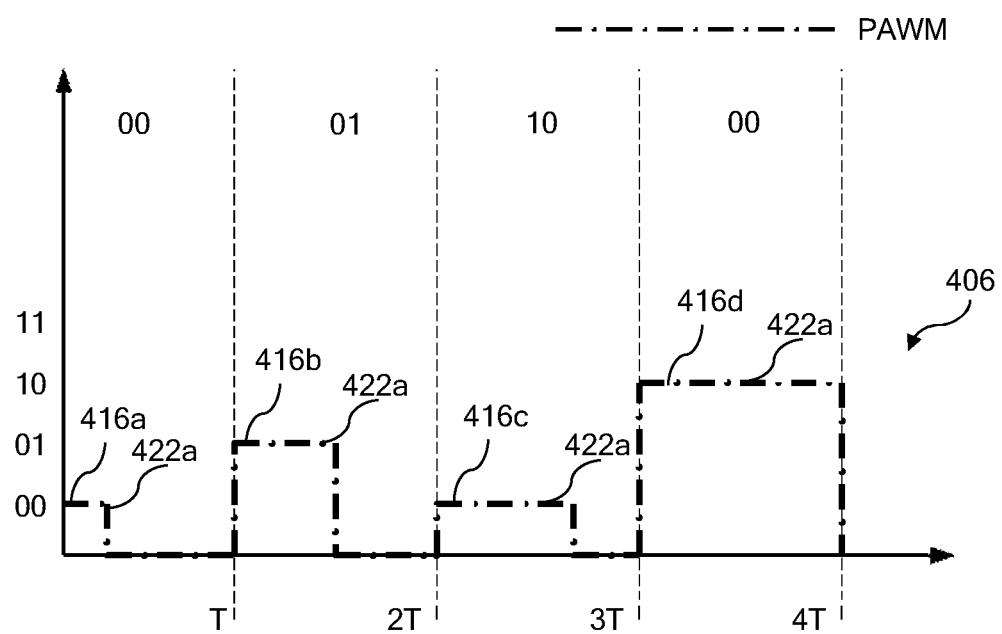
FIG. 4D shows the pulse amplitude width modulated signal output from the sensor of FIG. 4A, according to aspects of the disclosure.

FIGS. 4B-4D depict exemplary signals representing the PWM signal 416, the PAM signal 422, and the PAWM signal 406 from the system of FIG. 4A, respectively. The PWM signal 416 of FIG. 4B may be characterized by up to four duty-cycles, each duty cycle representative of a 2-bit binary word. Accordingly, the PWM signal 416 may have a 25% duty cycle 416a over a first period (0-T) and may indicate a 2-bit binary word '00'. Over the second period (T-2T), a 50% duty cycle 416b may be indicative of the word '01'; in the third period (2T-3T) a 75% duty cycle 416c may be indicative of the word '10'; and a 100% duty cycle 416d in the fourth period (3T-4T) may be indicative of the word '11'. Therefore, the PWM signal 416 may convey a dataset including binary values '00' '01' '10' '11' at each respective time T, 2T, 3T, and 4T.

The PAM signal 422 may be characterized by up to four amplitudes, each amplitude level corresponding to a 2-bit binary word (e.g., a PAM4 protocol). Accordingly, in one aspect, a first amplitude 422a, shown in a first period (0-T) may represent the word '00.' A second amplitude 422b, shown in a second period (T-2T) may represent '01'; a third amplitude 422c in the third period (2T-3T) represents '00' again; and a fourth amplitude 422d represents '10' in the fourth period (3T-4T). Accordingly, the PAM signal 422 may convey a dataset including binary values '00' '01' '00' '10' at each respective time T, 2T, 3T, and 4T. For example, the value '00' may indicate "no error," while the value '01' may indicate Error #1 and '10' may indicate Error #2. Accordingly, the error diagnostic circuit may have no detected errors over time T, and 3T, while at time 2T, Error #1 is present and at time 4T, Error #2 is present.

According to one aspect, the PAWM signal 406 of FIG. 4D may convey over the time 0-4T the two discrete datasets related to the angle position and the error codes. Table 1 below details the independent datasets obtained from the sensor 404:

TABLE 1

| Time | Angle Position of Target | Error Code |
| --- | --- | --- |
| 0 | 0° (0% Duty Cycle) | None |
| T | 90° (25% Duty Cycle) | None |
| 2T | 180° (50% Duty Cycle) | Error #1 |
| 3T | 270° (75% Duty Cycle) | None |
| 4T | 360° (100% Duty Cycle) | Error #2 |

One skilled in the art will appreciate that the error diagnostic circuit is not limited to two error codes and, even in a PAM4 modulation scheme additional error codes and signals may be implemented without deviating from the scope of the present disclosure. Additionally, the PAM encoding described herein is not limited to PAM4 schemes and other modulation schemes may be implemented including, without limitation, PAM3, PAM5, PAM16, or the like. Stated differently, the datasets represented by the PWM signal 416 and the PAM signal 422 that are combined to generate the PAWM signal 406 according to aspects of the disclosure are not limited to the example data described or to the example number of values, or elements described.

Figure 5:
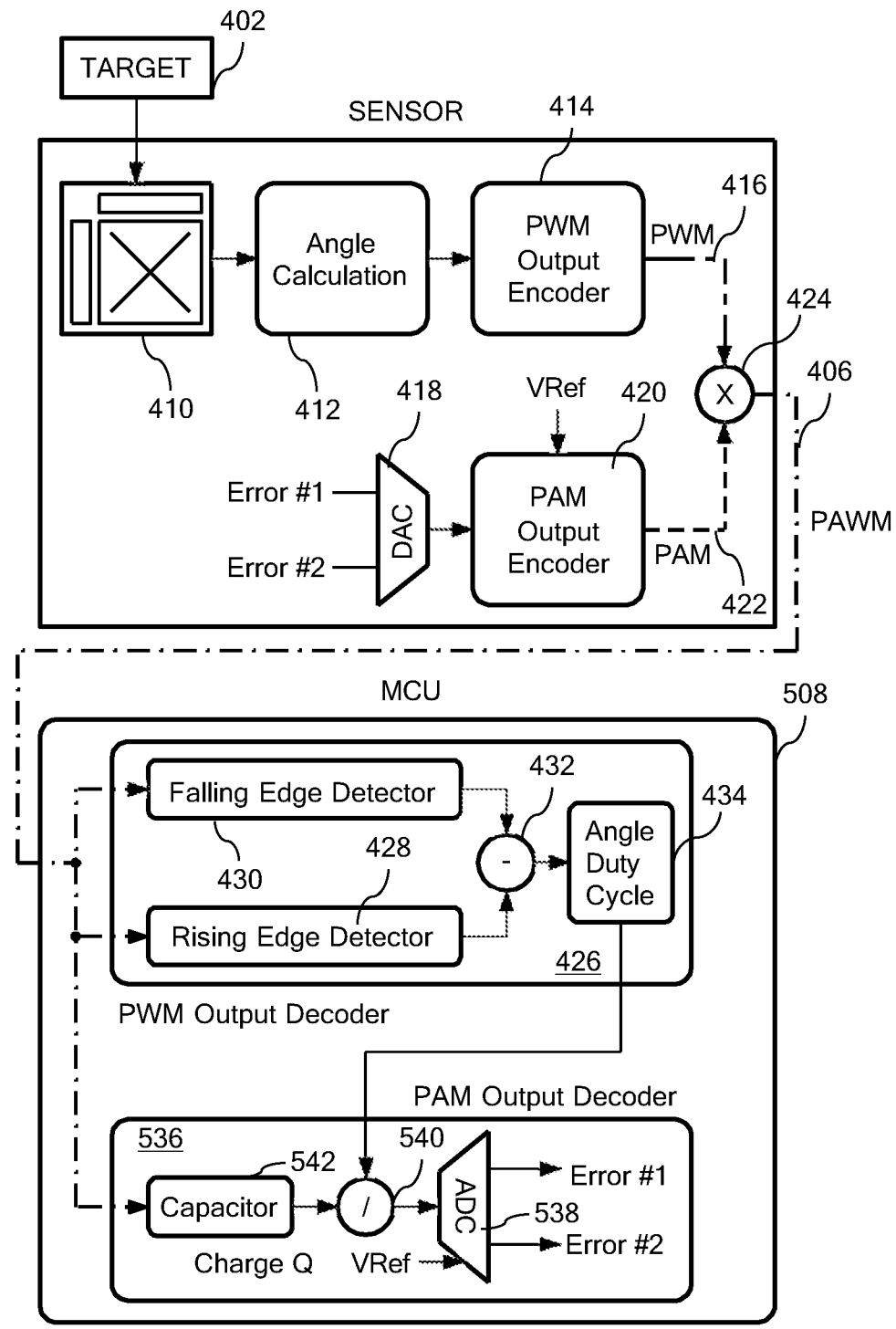
FIG. 5 shows a block diagram of a system for encoding and decoding a pulse amplitude width modulation signal with an alternative decoding system, according to aspects of the disclosure.

FIG. 5 depicts an MCU 508 including an alternative decoder configuration from that of the system of FIG. 4A. The target 402 and sensor 404 are similar, however the MCU 508 may include a PAM output decoder 536 that uses a capacitor 542 and a divider 540 in conjunction with the duty cycle calculation 434 from the PWM output decoder 426 to determine the amplitude of the PAWM signal 406. According to one aspect, since the duty cycle is known (from the PWM output decoder 426), the MCU 508 can charge the capacitor 542 for the time period T then use the divider 540 to divide the resulting charge, Q, by the duty cycle. This will give the amplitude of the PAWM signal 406, which can be supplied to the ADC 538 to decode the amplitude levels and corresponding error codes. The use of the capacitor 542 and divider 540 may eliminate the need to supply the rising edge of every pulse to the ADC.

While aspects of the present disclosure include the use of a target, magnetic field sensing elements, sensors, angle position calculations and diagnostic circuits, one skilled in the art will recognize that the scope of the present disclosure is not limited to magnetic field sensing and the encoding and decoding of signals relating to an observed target. Aspects of the present disclosure are applicable to any encoding/decoding operation and system in which it is desirable to transmit independent datasets across a system.

Figure 6:
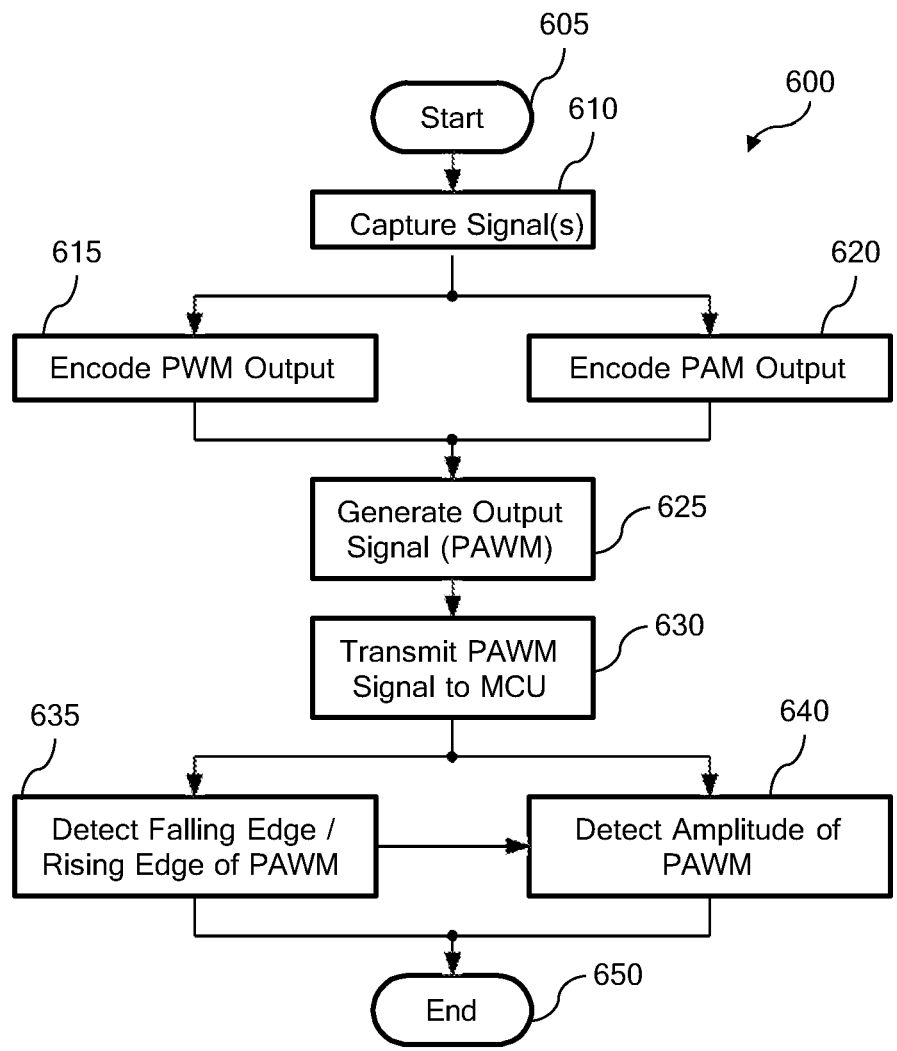
FIG. 6 is a flow diagram illustrating encoding and decoding of a pulse amplitude width modulation protocol, according to aspects of the disclosure.

Turning now to FIG. 6, a flow diagram 600 illustrates a PAWM protocol according to one or more aspects of the present disclosure. The protocol may start, as shown in block 605, followed by the capture of one or more signals, shown in block 610. According to one aspect, a first signal may be obtained from a sensing element adapted to observe or detect a target. A second signal may be obtained from the sensor or it may be obtained from a second source, for example a diagnostic circuit.

As shown in block 615, the protocol may encode a PWM output signal. A processor receiving the first signal may determine from the first signal a characteristic or other data, such as an angular position of a rotating target, and encode a PWM signal with the angle information. As described herein, in one aspect the duty cycle of the modulated signal may be indicative of the rotational position of the target.

As shown in block 620, the protocol may encode a PAM output signal from a second signal, for example from either the sensing element or another source like a diagnostic circuit. A processor receiving the second signal may determine from the signal source a second characteristic or data. Such data may be encoded as the amplitude level of a PAM signal.

As shown in block 625, the protocol may generate a PAWM signal by multiplying the PWM output signal and the PAM output signal. The resulting signal, as described herein, carries the encoded data from the first signal in the pulse width and encoded data from the second signal in the amplitude level. As shown in block 630, the protocol transmits the PAWM signal to a MCU to be decoded and further processed by the system.

According to one aspect, as shown in block 635, a PWM decoder may determine a rising and falling edge of the PAWM signal and subtract the two values to determine the duty cycle. The duty cycle of the pulse may be representative of the characteristic or data from the first signal. Similarly, a PAM decoder may determine the amplitude of the PAWM signal, as shown in block 640. According to one aspect, the protocol may use the rising edge of the PAWM signal and a comparator to determine the amplitude. According to another aspect, the protocol may use the duty cycle and a charged capacitor, as described herein, to determine the amplitude. The protocol may determine the second characteristic or data corresponding to the determined amplitude level. The protocol, as shown in block 650 may end with the MCU having decoded two independent characteristics or datasets from one transmitted signal.

Accordingly, the PAWM protocol described herein may obtain multiple independent datasets that may be encoded, transmitted and decoded from a single carrier signal. The protocol is agnostic to source to the extent that the observed data may be encoded into one or more of the pulse width or pulse amplitude of a carrier signal.

As used herein, the terms "processor" and "controller" are used to describe elements that perform a function, an operation, or a sequence of operations. The function, operation, or sequence of operations can be hard coded into an electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory, in a discrete electronic circuit which can be analog or digital, and/or in special purpose logic circuitry (e.g., a field programmable gate array (FPGA)). Processing can be implemented in hardware, software, or a combination of the two. Processing can be implemented using computer programs executed on programmable computers/machines that include one or more processors, a storage medium or other article of manufacture that is readable by the processor (including volatile and non-volatile memory and/or storage elements), at least one input device and one or more output devices. Program code can be applied to data entered using an input device to perform processing and to generate output information. A processor or controller can contain internal processors or modules that perform portions of the function, operation, or sequence of operations. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

As used herein, the term "magnetic field sensor" or simply "sensor" is used to describe a circuit that uses one or more magnetic field sensing elements, generally in combination with other circuits. The magnetic field sensor can be, for example, a rotation detector, a movement detector, or a proximity detector. A rotation detector (or movement detector) can sense passing target objects, for example, magnetic domains of a ring magnet or a ferromagnetic target (e.g., gear teeth) where the magnetic field sensor is used in combination with a back-bias or other magnet and can determine target movement speed. Ferromagnetic objects described herein can have a variety of forms, including, but not limited to, a ring magnet having one or more pole pairs, and a gear having two or more gear teeth. Ferromagnetic gears are used in some examples below to show a rotating ferromagnetic object having ferromagnetic features, i.e., teeth. However, in other embodiments, the gear can be replaced with a ring magnet having at least one pole pair. Also, linear arrangements of ferromagnetic objects are possible that move linearly.

As used herein, the term "magnetic field sensing element" is used to describe a variety of electronic elements that can sense a magnetic field. The magnetic field sensing element can be, but is not limited to, a Hall effect element, a magnetoresistance element, a magnetotransistor, or an inductive coil. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate or in the plane of the substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of maximum sensitivity perpendicular to a substrate, while metal based or metallic magnetoresistance elements (e.g., GMR, TMR, AMR) and vertical Hall elements tend to have axes of maximum sensitivity parallel to a substrate.

As used herein, the term "magnetic field signal" is used to describe any signal that results from a magnetic field experienced by a magnetic field sensing element.

It should be understood that a so-called "comparator" can be comprised of an analog comparator having a two-state output signal indicative of an input signal being above or below a threshold level (or indicative of one input signal being above or below another input signal). However, the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

It is noted that various connections and positional relationships (e.g., over, below, adjacent, etc.) may be used to describe elements and components in the description and drawings. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

Also, the following definitions and abbreviations are to be used for the interpretation of the claims and the specification. The terms "comprise," "comprises," "comprising, "include," "includes," "including," "has," "having," "contains" or "containing," or any other variation are intended to cover a non-exclusive inclusion. For example, an apparatus, a method, a composition, a mixture, or an article, that includes a list of elements is not necessarily limited to only those elements but can include other elements not expressly listed or inherent to such apparatus, method, composition, mixture, or article.

References in the specification to "embodiments," "one embodiment," "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. An apparatus comprising:
    a first processor configured to generate a first signal including a modulated pulse width and first encoded data;
    a second processor configured to generate a second signal including a modulated amplitude and second encoded data; and
    an output controller configured to combine the first signal and the second signal to generate an output signal, wherein the pulse width of the output signal is indicative of the first data and the amplitude is indicative of the second data.

2. The apparatus of claim 1 wherein the output controller includes a multiplier configured to multiply the first signal and the second signal to generate the output signal.

3. The apparatus of claim 1 further comprising a decoder operable to decode the output signal to determine the first data and the second data.

4. The apparatus of claim 3 wherein the decoder comprises an analog-to-digital converter adapted to measure an amplitude level of the output signal after a rising edge.

5. The apparatus of claim 3 wherein the decoder comprises:
    a capacitor, wherein the capacitor is charged over a time, T, and the amplitude is determined by dividing the charge of the capacitor, Q, by a duty cycle of the output signal; and an analog-to-digital converter adapted to decode the amplitude to determine the first data.

6. The apparatus of claim 1 further comprising at least one sensing element operable to generate at least one of the first signal and the second signal.

7. The apparatus of claim 6 wherein the at least one sensing element comprises one or more of a magnetic field sensing element, an inductive sensing element, a resistive sensing element, an optical sensing element, a pressure sensing element, a motor control element, or a temperature sensing element.

8. The apparatus of claim 7 wherein the at least one sensing element comprises a magnetic field sensing element operable to generate the first signal, wherein the first signal is indicative of a magnetic field associated with an object.

9. The apparatus of claim 8 wherein the first data is one or more of flux density, angle, position, speed, or current.

10. The apparatus of claim 8 wherein the second data includes a direction of rotation of the object.

11. The apparatus of claim 1 wherein the second signal includes a diagnostic signal.

12. The apparatus of claim 11 further comprising a diagnostic circuit configured to generate the diagnostic signal.

13. A method of communicating an output signal, the method comprising:
    generating one or more signals;
    processing the one or more signals to generate a pulse width modulated (PWM) signal having a pulse width encoded with first data;
    processing the one or more signals to generate a pulse amplitude modulated (PAM) signal having an amplitude encoded with second data; and
    generating an output signal by combining the pulse width modulated signal and the pulse amplitude modulated signal, wherein the pulse width of the output signal is indicative of the first data and the amplitude is indicative of the second data.

14. The method of claim 13 further comprising multiplying the first signal and the second signal to generate the output signal.

15. The method of claim 13 wherein the one or more signals are generated by at least one sensing element.

16. The method of claim 15 wherein the at least one sensing element comprises one or more of a magnetic field sensing element, an inductive sensing element, a resistive sensing element, an optical sensing element, a pressure sensing element, a motor control element, or a temperature sensing element.

17. The method of claim 16 wherein the at least one sensing element comprises a magnetic field sensing element operable to generate the first signal, wherein the first signal is indicative of a magnetic field associated with an object.

18. The method of claim 13 further comprising:
    decoding by a microcontroller the pulse width of the output signal to determine the first data; and
    decoding by the microcontroller the amplitude of the output signal to determine the second data.

19. The method of claim 18 wherein decoding of the amplitude comprises measuring the amplitude level of the output signal after a rising edge.

20. A method comprising:
    generating one or more signals, wherein at least one of the one or more signals is generated by a magnetic field sensing element and is indicative of a magnetic field associated with an object;
    processing the one or more signals to generate a pulse width modulated (PWM) signal having a pulse width encoded with first data;
    processing the one or more signals to generate a pulse amplitude modulated (PAM) signal having an amplitude encoded with second data; and
    generating an output signal by combining the pulse width modulated signal and the pulse amplitude modulated signal.

* * * * *